Dec. 4, 1928.
M. THUM
1,693,680
JOINT FOR TUBULAR STRUCTURES
Filed April 11, 1927
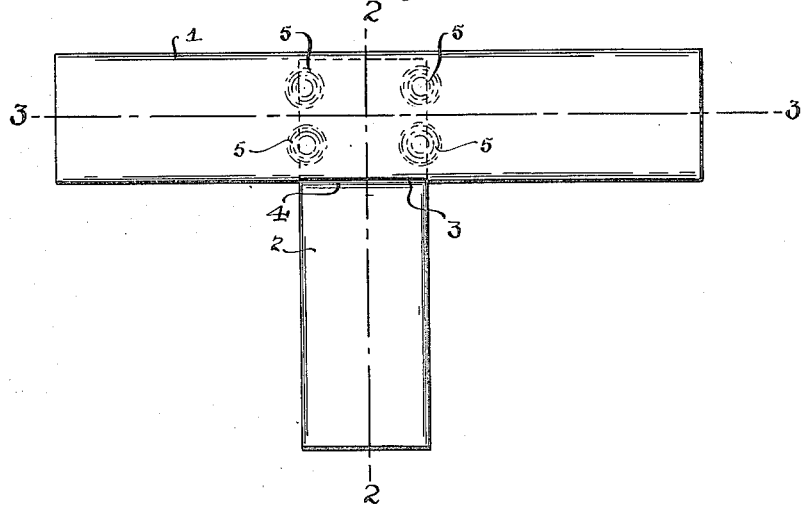
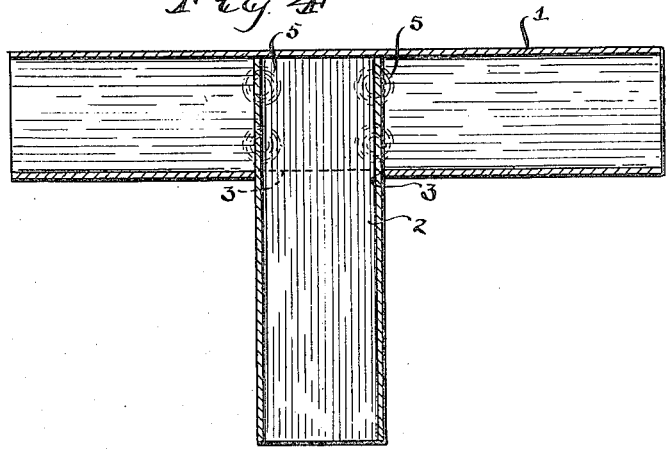
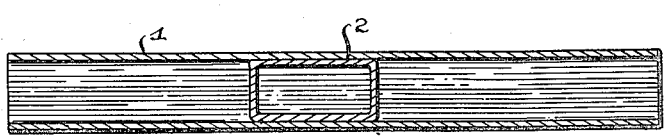
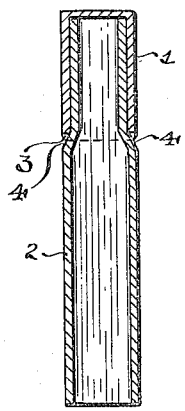
INVENTOR
Martin Thum
BY H. H. Simms
his ATTORNEY Patented Dec. 4, 1928.

1,693,680

UNITED STATES PATENT OFFICE.

MARTIN THUM, OF ROCHESTER, NEW YORK.

JOINT FOR TUBULAR STRUCTURES.

Application filed April 11, 1927. Serial No. 182,873.

The present invention relates to joints for tubular structures and an object thereof is to provide a spot welded joint between two tubular elements of rectangular cross section. To this and other ends, the invention consists of certain parts and combinations of parts, all of which will be hereinafter described; the novel features being pointed out in the appended claims.

In the drawings:

Fig. 1 is a plan view of the drawing;

Fig. 2 is a section on the line 2—2, Fig. 1;

Fig. 3 is a section on the line 3—3, Fig. 1; and

Fig. 4 is a central section in a plane parallel with the plan view shown in Fig. 1.

Prior to this invention considerable difficulty has been met in uniting two tubular elements of rectangular cross section by spot welding. This invention makes it possible to provide a strong spot welded joint between two tubular elements of rectangular cross section.

Referring more particularly to the illustrated embodiment of the invention, 1 illustrates one of the tubular elements and 2 the other tubular element. The tubular element 1 has an opening 3 cut into one of its sidewalls of a width equal to the width between the two sidewalls that meet the side wall having the opening 3. Two opposite side walls of the member 2 have portions 4 in the opposite ends, depressed the thickness of the sheet metal, these portions 4 being each of a length equal to the distance between the opening 3 and the side wall of the member 1 opposite the opening, so that the end of the member 2 is reduced in width in order to fit between two side walls of the member 1 when passed through the opening 3, the end of the member 2 abutting the side walls of the member 1 opposite the opening 3.

The electrodes of an electrical spot welder are then placed on the joint at the spots 5 and also on the other side of the joint opposite said spots. These points are aligned with the portions 6 of two opposite walls of the member 2 so that said portions 2 will act as conductors between the electrodes on opposite sides of the joints during spot welding and the two opposite walls of the member 1 are firmly welded to the portions 4.

What I claim as my invention and desire to secure by Letters Patent is:

1. A joint of the class described comprising a tubular member of rectangular cross section having an opening in one of its walls, and a second tubular member of rectangular cross section fitting in said opening and having two opposite walls thereof abutting the inner faces of two opposite walls of the first mentioned member and spot welded thereto in line with the other two opposite walls of the second member.

2. A joint of the class described comprising a tubular member of rectangular cross section having one of its walls provided with an opening extending between two other walls of said member, and a second tubular member having a rectangular cross section with two of its walls depressed near one end, said end being fitted in the first mentioned member through the opening of the latter and having its two depressed walls abutting the inner faces of the two opposite walls of the first mentioned member and spot welded thereto in line with the two walls of the second mentioned member connecting the depressed walls the extreme end of the second member abutting the inner face of that wall of the first member opposite the wall provided with the opening.

MARTIN THUM.